United States Patent
Ortiz Mezquita

(10) Patent No.: US 9,855,492 B2
(45) Date of Patent: Jan. 2, 2018

(54) MACHINE FOR PINBALL-TYPE RECREATIONAL GAMES

(71) Applicant: Antonio Ortiz Mezquita, Zamora (ES)

(72) Inventor: Antonio Ortiz Mezquita, Zamora (ES)

( * ) Notice: Subject to any disclaimer, the term of this patent is extended or adjusted under 35 U.S.C. 154(b) by 288 days.

(21) Appl. No.: 15/029,426

(22) PCT Filed: Mar. 12, 2014

(86) PCT No.: PCT/ES2014/070174
§ 371 (c)(1),
(2) Date: Apr. 14, 2016

(87) PCT Pub. No.: WO2014/184405
PCT Pub. Date: Nov. 20, 2014

(65) Prior Publication Data
US 2016/0296834 A1     Oct. 13, 2016

(30) Foreign Application Priority Data

May 17, 2013    (ES) ............................... 201330604 U

(51) Int. Cl.
*A63F 7/02*           (2006.01)
*A63F 7/30*           (2006.01)
(Continued)

(52) U.S. Cl.
CPC ............. *A63F 7/027* (2013.01); *A63F 7/307* (2013.01); *A63F 13/46* (2014.09); *A63F 13/95* (2014.09);
(Continued)

(58) Field of Classification Search
CPC .......... A63F 7/027; A63F 7/307; A63F 13/46; A63F 13/95; A63F 2007/348; A63F 2009/2488; A63F 2250/14
See application file for complete search history.

(56) References Cited

U.S. PATENT DOCUMENTS

| 5,284,342 A | 2/1994 | Tanzer et al. |
| 5,797,795 A | 8/1998 | Takemoto et al. |

(Continued)

FOREIGN PATENT DOCUMENTS

JP        2005-80810        3/2005

OTHER PUBLICATIONS

Supplementary European Search Report dated Jun. 20, 2016 in corresponding European patent application No. 14 79 7324.
(Continued)

*Primary Examiner* — Raleigh W Chiu
(74) *Attorney, Agent, or Firm* — Wenderoth, Lind & Ponack, L.L.P.

(57) ABSTRACT

The invention relates to a machine (1) for pinball-type recreational games, characterized in that it comprises a module for the monitoring and storage (2) of operative variables of the machine (1), comprising means for communication with remote storage and control equipment (9), where said monitoring and storage module (2) also comprises the following elements: at least one CPU (4) connected to a plurality of sensor elements; at least one data-receiving and data-encoding device (3) connected to said CPU (4); at least one multimedia support unit (5); at least one electronic purse (6); and an electromechanical counting device (7) for counting the number and amplitude of the electric pulses received from said electronic purse (6).

12 Claims, 3 Drawing Sheets

(51) Int. Cl.
*A63F 13/46* (2014.01)
*A63F 13/95* (2014.01)
*A63F 7/34* (2006.01)
*A63F 9/24* (2006.01)

(52) U.S. Cl.
CPC . *A63F 2007/348* (2013.01); *A63F 2009/2488* (2013.01); *A63F 2250/14* (2013.01)

(56) References Cited

U.S. PATENT DOCUMENTS

| | | | |
|---|---|---|---|
| 8,784,170 B1* | 7/2014 | Murakami | A63F 13/00 463/25 |
| 2003/0107171 A1 | 6/2003 | Armstrong et al. | |
| 2004/0166918 A1 | 8/2004 | Walker et al. | |
| 2006/0046842 A1 | 3/2006 | Mattice et al. | |
| 2008/0009331 A1* | 1/2008 | Moffett, VI | A63F 7/027 463/3 |
| 2008/0132332 A1 | 6/2008 | Pryor | |
| 2013/0147111 A1* | 6/2013 | Popadiuk | A63F 7/027 273/118 A |
| 2016/0296834 A1* | 10/2016 | Ortiz Mezquita | A63F 7/027 |

OTHER PUBLICATIONS

International Search Report dated Jun. 10, 2014 in International Application No. PCT/ES2014/070174.
Written Opinion of the International Searching Authority dated Jun. 10, 2014 in International Application No. PCT/ES2014/070174.

* cited by examiner

MACHINE FOR PINBALL-TYPE RECREATIONAL GAMES

OBJECT OF THE INVENTION

This invention relates to a machine for pinball-type recreational games which presents a series of improvements compared to existing pinball-type machines in the state of the art; these improvements include the incorporation of a module for monitoring and storing different operative variables of the machine, and damping and anti-blocking devices for the game ball.

The principal field of application of this invention is the industry responsible for manufacture, distribution and commercial operation of electrical and electronic machines and equipment for recreational games.

TECHNICAL PROBLEM TO ADDRESS AND BACKGROUND TO THE INVENTION

Currently, there is a wide array of machines for recreational uses which have systems allowing the measurement of different operating variables, and to send information relating to said variables to remote equipment.

However, currently there appear to be no recreational machines of the "pinball"-type which incorporate said systems of measuring said operative variables, such as faults, scores, collection count and other incidents, and which have the capacity to send information automatically to remote equipment.

In addition, in conventional pinball-type machines, the playing surface generally has a very limited useful life, because of the constant impact of the game ball on said playing surface.

As an additional element to bear in mind, said game ball often becomes trapped in certain areas of the playing surface, making it necessary to free the ball to continue a game.

Another additional element to bear in mind is the electrical power supply for said pinball-type recreational machines, which is usually based on a transistor or group of transistors located on an electronic plate, which adapt the alternating network voltage to an appropriate value of continuous voltage to operate the different elements of the machine. This power supply system has a disadvantage in that, at certain times during a normal game of pinball, the machines require an increase in the power supply, which often causes voltage drops and the need to restart the machine, because of the limited effectiveness of the electronic power supply.

This invention refers to machines for pinball-type recreational games, irrespective of the manufacture or developer thereof, providing a solution to the abovementioned problems in the state of the art of pinball-type machines.

DESCRIPTION OF THE INVENTION

This invention relates to a machine for pinball-type recreational games, which comprises a module for monitoring and storing the machine's operating variables, comprising means of communication with a remote storage and control equipment, in which said monitoring and storing module also comprises the following elements:

i. at least one CPU connected to an array of sensor elements, for measuring:
  a. variables related to the state of preservation of the machine, and;
  b. game variables, relating to the score obtained by the player
ii. at least one device for receiving and coding data, connected to the aforementioned CPU, for receiving at least the data sent from the CPU, coding of the data received and despatch of said data to
iii. at least one multimedia support unit with a two-way connection to the data reception and coding device which comprises the means of communication for connection with the remote storage and control equipment;
iv. at least one electronic purse, with the capacity for insertion of different types of coins, generation of electrical pulses of variable amplitude, and the despatch of said electrical pulses of variable amplitude to
v. an electromechanical counting device, to count the number and amplitude of the electrical pulses received from the aforementioned electronic purse, which is connected to the data reception and coding device to re-send the count of the number of pulses to said data reception and coding device.

The monitoring and storage module typically has a two-way connection to the remote storage and control equipment, to send the data related to game variables, the data related to collection from the machine and the data related to the state of preservation of the machine.

The aforementioned multimedia support unit has preferably at least one entry port for connection of external devices, and manual uploading and downloading of data.

The aforementioned multimedia support unit comprises a viewing screen, to display the data related to game variables, the instructions on how to use the machine and the data relating to the state of preservation of the machine.

The machine for pinball-type recreational games which is the object of this invention comprises an internal power source, connected to the monitoring and storage module.

The machine for pinball-type recreational games which is the object of this invention comprises at least one camera for capturing values related to game variables and to monitor the identity of the users of the machine.

Preferably, the machine for pinball-type recreational games which is the object of this invention comprises at least two cameras to carry out the aforementioned function.

In a preferred embodiment of the invention, the machine for pinball-type recreational games comprises a user validation and access device using proximity, biometric or any other type of sensors compatible with the function to be carried out.

The machine for pinball-type recreational games which is the object of this invention comprises at least one device for damping the impacts of the game ball on the playing surface.

The devices for damping the impacts are anchored to supports included in the machine, and comprise a configuration which is complementary to the geometry of said supports, with at least one ramp for damping the impact of the game ball on the playing surface.

The machine for pinball-type recreational games which is the object of this invention comprises at least one anti-blocking device, which comprises a V-shaped laminar profile structure, to prevent the ball from becoming stuck in the place on the playing surface where it is installed.

The means of communication comprise an element selected from a modem, a wireless network adapter and a combination of both, for connection to a remote storage and control equipment.

BRIEF DESCRIPTION OF THE FIGURES

This detailed description will be understood better with the help of the following figures.

Figure 1:
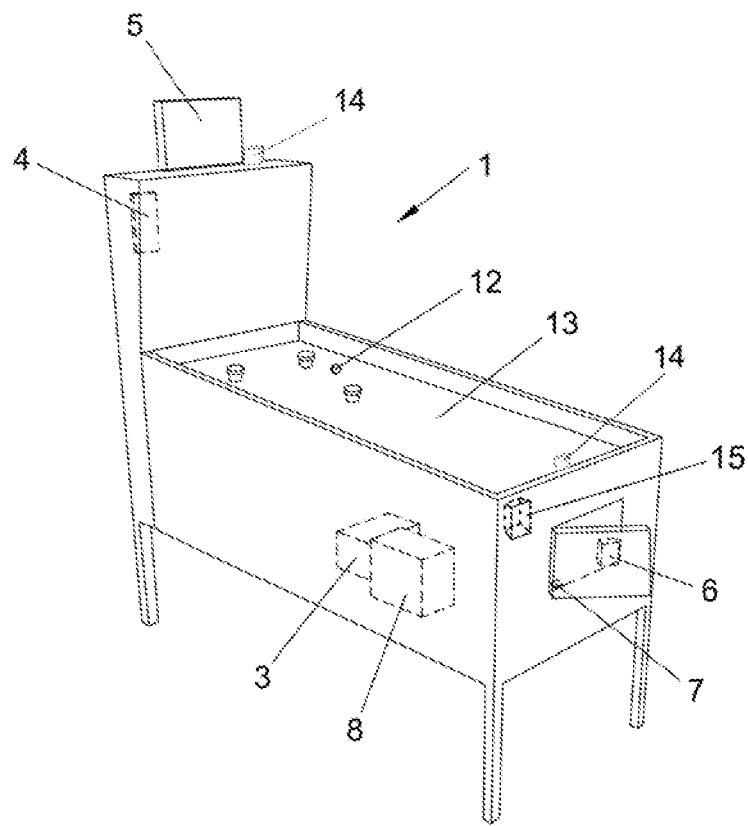
FIG. 1: Shows a schematic representation of a machine for pinball-type recreational games, with a monitoring and storage module made up of different elements.
Figure 2:
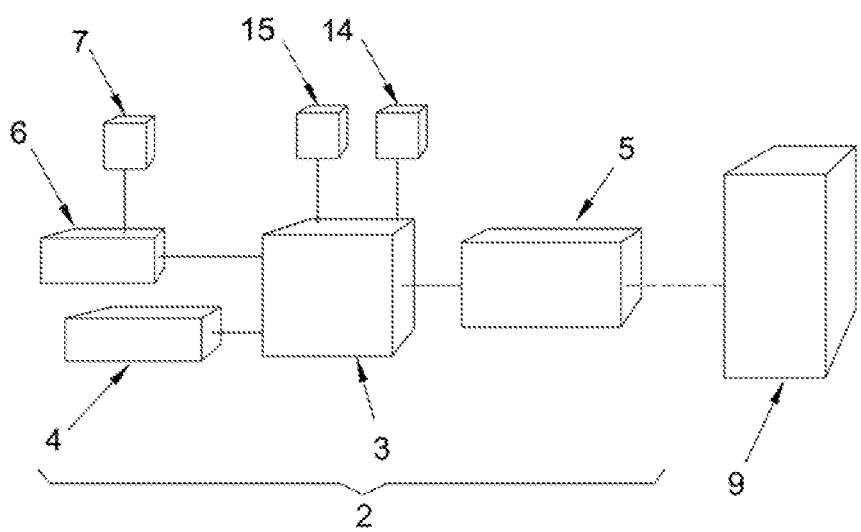
FIG. 2: Shows a block diagram with the different elements included in the monitoring and storage module, their connection with each other and the connection of said monitoring and storage module with a remote storage and control equipment.

Presented below is a list of the numerical references used in the figures:
1. Machine.
2. Monitoring and storage module.
3. Data reception and coding device.
4. CPU.
5. Multimedia support device.
6. Electronic purse.
7. Electromechanical counting device.
8. Power supply.
9. Remote storage and control equipment.
10. Damping device.
11. Anti-blocking device.
12. Game ball.
13. Playing surface.
14. Camera.
15. User validation and access device.

DETAILED DESCRIPTION OF A FORM OF EMBODIMENT OF THE INVENTION

This invention refers to a machine (1) for pinball-type recreational games which comprises a series of improvements compared to conventional pinball-type machines (1).

The principal characteristic of this machine (1) for pinball-type recreational games is that it incorporates a monitoring and storage module (2) for different operating variables of the machine (1), with the capacity to communicate with a remote storage and control equipment (9).

One of the operating variables monitored by the aforesaid monitoring and storage module (2) is the quantity of coins inserted by the user of the pinball-type machine (1), and the value of each of these coins inserted.

In addition, another of the characteristics of the machine (1) for pinball-type recreational games which is the object of this invention is the incorporation of an array of devices for damping (10) the impacts of the game ball (12) on the playing surface (13).

The game ball (12) for the pinball-type machines (1) is made of a material of variable hardness; usually, this game ball (12) is made of steel, which means that it is of the utmost importance to damp the impacts made by this game ball (12) on different areas of the playing surface (13), causing deterioration thereof and the shortening of the useful life of these pinball-type machines (1) or, at least, of some constituent parts of these machines (1).

In addition, the machine (1) for pinball-type recreational games which is the object of this invention comprises an anti-blocking device (11) for the game ball (12), to prevent said game ball (12) from becoming stuck, which often happens in certain areas of the playing surface (13) in conventional pinball-type machines (1).

According to a preferred embodiment of this machine (1) for pinball-type recreational games, the monitoring and storage module (2) of different operating variables comprises the following elements, shown schematically in FIG. 1:
a data reception and coding device (3);
a multimedia support device (5);
a CPU (4);
two cameras (14);
a user validation and access device (15);
an electronic purse (6), and;
an electromechanical counting device (7).

A power supply (8) provides the energy necessary to operate all the elements included in the system of monitoring and storage (2) of different operating variables.

Preferably, the multimedia support device (5) for the monitoring and storage module (2) of different operating variables is connected to the data reception and coding device (3), and has the possibility of two-way communication with said device (3).

Preferably, said multimedia support device (5) has the capacity to reproduce audio, images or video and, in its preferred embodiment, has a network connection adapter.

Preferably, the CPU (4) for the monitoring and storage module (2) of different operating variables is connected to the data reception and coding device (3), and has the possibility of two-way communication with said device (3).

As mentioned earlier, one of the variables monitored by the monitoring and storage module (2) of different operating variables is the quantity of coins inserted into the pinball-type machine (1) by the user, and the value of said coins. For this purpose, the machine (1) for pinball-type recreational games which is the object of this invention incorporates, as an element constituting the monitoring and storage module (2), a multi-coin electronic purse (6) and, optionally, an electromechanical counting device (7), which is used to monitor on-site the number of coins inserted into the machine (1).

The multi-coin electronic purse (6) is connected to the electromechanical counting device (7) and, in turn, is connected to the data reception and coding device (3) of the monitoring and storage module (2) of different operating variables.

Once the coin inserted by the user into the electronic purse (6) has been validated, the electronic purse (6) sends electrical pulses to the electromechanical counting device (7), which notes the number and amplitude of the pulses received, increasing the value of the count made by as many units as the electronic purse (6) indicates.

The electronic purse (6) sends the pulses to the data reception and coding device (3) in the monitoring and storage module (2) of different operating variables, from where they are re-sent to the multimedia support device (5), where they are stored and re-sent, if required, to a remote storage and control equipment (9).

The data reception and coding device (3) can receive from the CPU (4), from the user validation and access device (15), and/or from the cameras (14) and other devices in the machine (1) which may be connected to said data reception and coding device (3), information relating both to events which occur during the course of the game and variables relating to incidents and the state of the machine (1).

This information is coded and stored. Any information which can be displayed on the multimedia support device (5) is sent to the multimedia support device (5), where it is viewed, in different formats, to allow interaction with the user of the machine (1) for pinball-type recreational games which is the object of this invention.

The multimedia support device (5) can also be used to view any type of multimedia file previously loaded onto said multimedia support device (5), be it videos explaining the game, instructions for use or any other type of notice, and can also be used as a vehicle for advertising.

Thanks to its connection to internet or any generic network, the monitoring and storage module (2) is able to send to a remote storage and control equipment (9) all the information from the data reception and coding device (3), information which is subsequently coded in said remote storage and control equipment (9).

With the information received, maintenance personnel can act to repair possible faults found in the machine (1), replace parts or carry out any other action.

In addition, said remote storage and control equipment (9) stores data of interest relating to money collected by the machine (1), and data related to the game, for the purpose of drawing up statistics.

The devices for damping (10) the impacts of the game ball (12) on the playing surface (13) have a structure which allows them to be anchored to a support element existing on the playing surface (13). Said support element typically consists of rails, which are found on conventional pinball-type machines (1), along which the game ball (12) rolls in different areas of the playing surface (13).

The damping devices (10) are used to ensure that, when the game ball (12) finishes its run along the aforementioned rails, the game ball (12) does not impact sharply on the playing surface (13), but instead slides gently down a ramp in the damping device (10) until it comes into contact with the playing surface (13).

Figure 3:
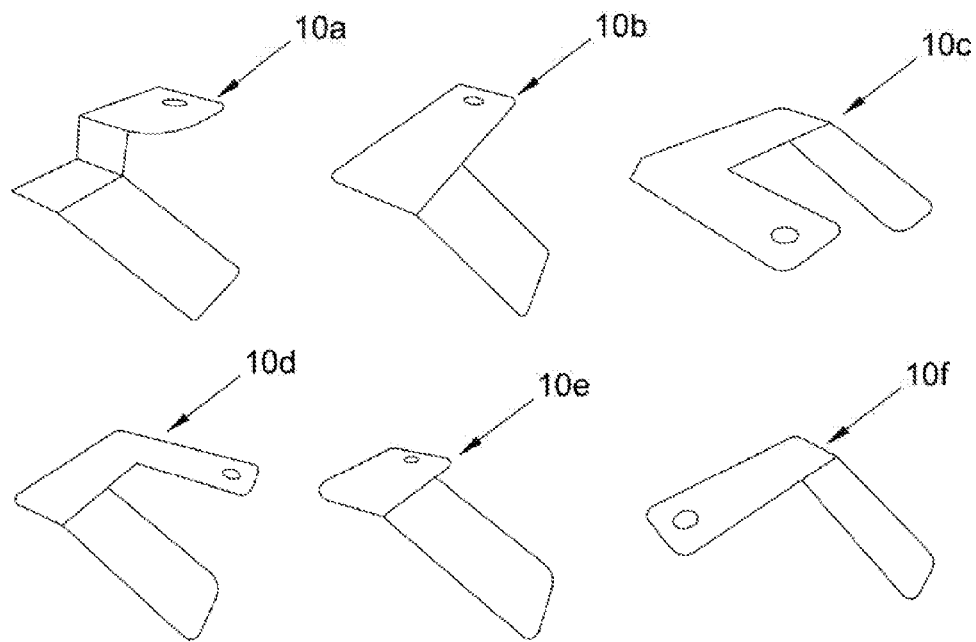
FIG. 3: Shows an example of different embodiments of a device for damping the impacts of the game balls on the playing surface.

FIG. 3 shows different possible embodiments (10a, 10b, 10c, 10d, 10e, 10f) of the aforementioned damping devices (10).

Figure 4:
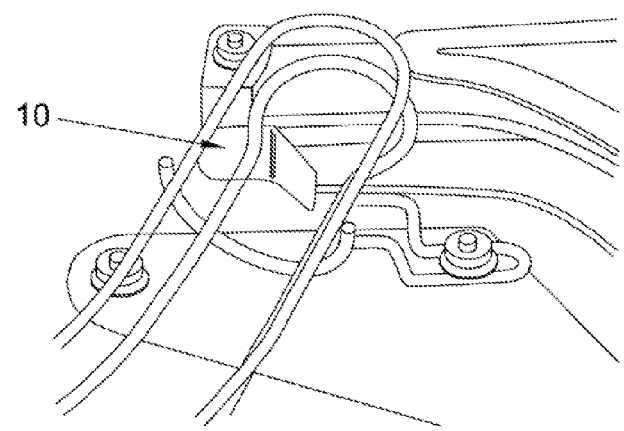
FIG. 4: Shows an isometric perspective view of the damping device mounted on its support.

FIG. 4 shows an isometric perspective view of the damping device mounted on its support.

Figure 5:
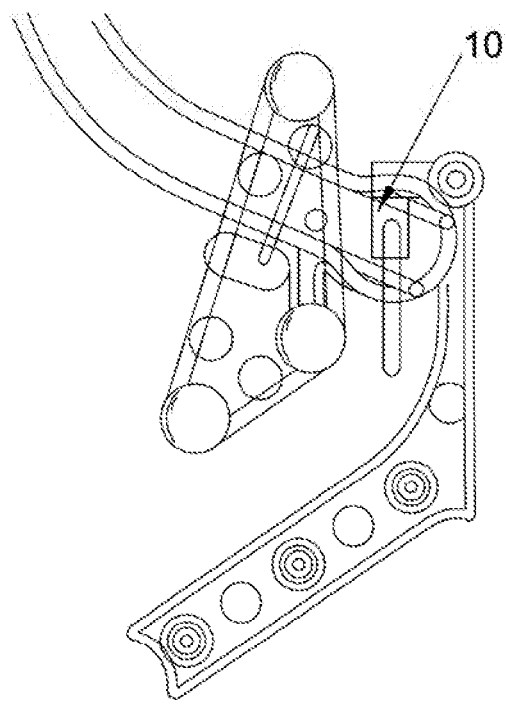
FIG. 5: Shows a flat view of the damping device mounted on its support.

FIG. 5 shows a plan view of the damping device mounted on its support.

The anti-blocking device (11) for the game ball (12) consists of a part with a V-shaped laminar profile, which directs the game ball (12) towards a certain area of the playing surface (13), when said game ball (12) comes into contact with said anti-blocking device (11).

Figure 6:
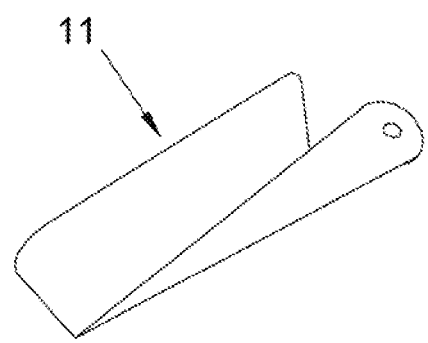
FIG. 6: Shows an example of a form of embodiment of an anti-blocking device for the game balls.

FIG. 6 shows an example of embodiment of the anti-blocking device (11) for the game ball (12).

The pinball-type machine (1) described previously makes it possible to carry out online competitions, and also "face to face" games between users of the machines (1), thanks to the connection provided for this purpose in the preferred embodiment of the machine (1), using the views of players and scoreboards captured by the cameras (14).

The characteristics of the pinball-type machine (1) described previously can be introduced, regardless of their particular features, in already existing pinball-type machines (1), simply by making the appropriate modifications to said already existing machines (1).

The present invention is not limited by the embodiment disclosed herein. Other forms of embodiment of a machine (1) for pinball-type recreational games, which introduces small modifications in the devices and systems described here, may be carried out by experts in the matter, without prejudice to its general nature.

In consequence, this invention is defined by the following claims.

The invention claimed is:

1. Machine (1) for pinball-type recreational games, characterised in that it comprises a monitoring and storage module (2) of the machine (1) operating variables, which comprises means of communication with a remote storage and control equipment (9), in which said monitoring and storage module (2) also comprises the following elements:
   i. at least one CPU (4) connected to an array of sensor elements, for measuring:
      a. variables related to the state of preservation of the machine (1), and;
      b. game variables, relating to the score obtained by the player;
   ii. at least one device for receiving and coding data (3), connected to the aforementioned CPU (4), for receiving at least the data sent from the CPU (4), coding of the data received and despatching of said data to
   iii. at least one multimedia support unit (5) with a two-way connection to the data reception and coding device (3) which comprises the means of communication for connection with the remote storage and control equipment (9);
   iv. at least one electronic purse (6), with the capacity for insertion of different types of coins, generation of electrical pulses of variable amplitude, and the despatch of said electrical pulses of variable amplitude to
   v. an electromechanical counting device (7), for counting the number and amplitude of the electrical pulses received from the aforementioned electronic purse (6), which is connected to the data reception and coding device (3) to re-send the count of the number of pulses to said data reception and coding device (3).

2. Machine (1) for pinball-type recreational games according to claim 1, characterised in that the monitoring and storage module (2) has a two-way connection with the remote storage and control equipment (9), for sending data related to the game variables, data related to money collected by the machine (1) and data related to the state of preservation of the machine (1).

3. Machine (1) for pinball-type recreational games according to claim 2, characterised in that the aforementioned multimedia support device (6) has at least one entry port for connection of external devices, for manual uploading and downloading of data.

4. Machine (1) for pinball-type recreational games according to claim 3, characterised in that the aforementioned multimedia support unit (5) comprises a viewing screen, to display the data related to game variables, the instructions on how to use the machine (1) and the data relating to the state of preservation of the machine (1).

5. Machine (1) for pinball-type recreational games according to claim 1, characterised in that it comprises an internal power source (8), connected to the monitoring and storage module (2).

6. Machine (1) for pinball-type recreational games according to claim 1, characterised in that it comprises at least one camera (14) for capturing values related to game variables, and for monitoring user identity.

7. Machine (1) for pinball-type recreational games according to claim 1, characterised in that it comprises at least two cameras (14) for capturing values related to game variables, and for monitoring user identity.

8. Machine (1) for pinball-type recreational games according to claim 1, characterised in that it comprises a user validation and access device (15) using proximity, biometric or any other type of sensor compatible with the function to be carried out.

9. Machine (1) for pinball-type recreational games according to claim 1, characterised in that it comprises at least one device (10) for damping the impacts of the game ball (12) on the playing surface (13).

10. Machine (1) for pinball-type recreational games according to claim 9, characterised in that the devices (10) for damping the impacts are anchored to supports included in the machine (1), and comprise a configuration which complements the structure of said supports, with at least one ramp for damping the impact of the game ball (12) on the playing surface (13).

11. Machine (1) for pinball-type recreational games according to claim 1, characterised in that it comprises at least one anti-blocking device (11), which comprises a V-shaped laminar profile structure, to prevent the game ball (12) becoming blocked on the playing surface (13) on which it is installed.

12. Machine (1) for pinball-type recreational games according to claim 1, characterised in that the means of communication comprise an element selected from a modem, a wireless network adapter and a combination of both, for connection to a remote storage and control equipment (9).

* * * * *